Nov. 24, 1964  M. C. ELLISON  3,158,506
RECORDING MATERIALS AND THEIR MANUFACTURE
Filed Sept. 11, 1961

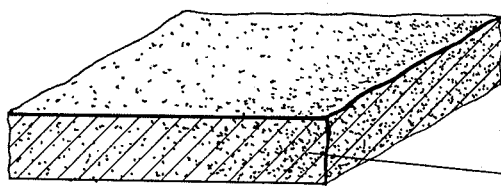

FIG. 1 — PAPER SHEET IMPREGNATED WITH CONDUCTIVE CHEMICAL COMPOSITION

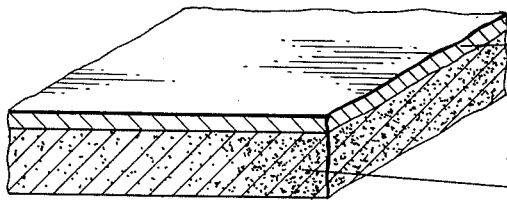

FIG. 2 — CONDUCTIVE COATING COMPOSITION / CARRIER SHEET IMPREGNATED WITH CONDUCTIVE CHEMICAL COMPOSITION

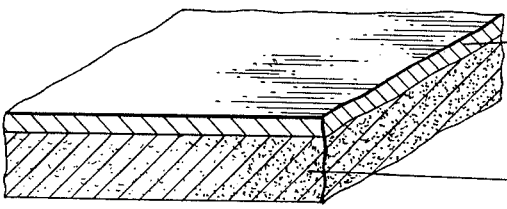

FIG. 3 — CONDUCTIVE METALLIC COATING / CHEMICALLY TREATED SUPPORTING SHEET

INVENTOR.
MICHAEL C. ELLISON
BY
Kegan, Bellamy & Kegan
ATTYS.

3,158,506
RECORDING MATERIALS AND THEIR MANUFACTURE
Michael C. Ellison, Indialantic, Fla., assignor to Graphic Controls Corporation, Buffalo, N.Y., a corporation of New York
Filed Sept. 11, 1961, Ser. No. 137,027
18 Claims. (Cl. 117—216)

The instant invention relates to novel recording sheet materials, such as recording papers, and their manufacture. More particularly, it relates to improved recording papers which under the localized action of a stylus change chemically to provide a conspicuously contrasting mark.

Recording papers are used extensively in connection with measuring instruments wherein a stylus, generally by heat and/or pressure, acts upon paper to produce a mark. For example, colored paper, such as red or black paper is covered with a light colored or white opaque film. Upon contact with the stylus, the film is removed or melted becoming translucent, and the dark paper behind the surface coating becomes visible. The physical nature of these opaque coatings is changed under the localized pressure or heat of a stylus so that the contrasting paper becomes visible providing a mark.

In practice, recording paper which is pressure-sensitive is unsatisfactory for many purposes because when handled and stored, it comes in pressurable contact with objects other than the stylus, and the record becomes disfigured. On the other hand, the thermosensitive papers which have a "blushed" opaque coating are not always uniform and are relatively expensive.

I have prepared a new type of electro-sensitive and heat sensitive recording papers which can be used with conventional recorders presently in use. However, unlike conventional coated papers whereby marks result from physical change of the coating caused by contact with the stylus, marking of my improved paper results from chemical changes upon contact with a stylus.

In the instant invention, paper is treated with two or more chemicals which under the localized action of the stylus change chemically so as to cause a color change in the paper along the line of contact with the stylus. As the stylus moves across the paper, a trace of contrasting or darker color is generated.

More specifically, paper is treated with a primary material comprising an indicator capable of a substantially instantaneous color change and a secondary material comprising a reactive substance or substances which in response to heat or electricity yield a product capable of causing the color change of the indicator.

In one preferred embodiment of the invention, a heat sensitive recording paper is prepared by treating paper with an emulsion of a salt such as sodium or potassium bicarbonate and a pH or acid-base type indicator, such as phenolphthalein.

At points where a stylus comes in contact with this paper, the potassium bicarbonate decomposes to potassium hydroxide and carbon dioxide, and under the influence of potassium hydroxide the phenolphthalein changes color providing a red-brown mark on the paper.

Other features and advantages not specifically enumerated will be apparent after a consideration of the following detailed descriptions and the appended claims.

In the drawings:

FIGURE 1 is a perspective view of a section of one of the papers according to the invention;

FIGURE 2 is perspective view and depicting a modification of FIGURE 1 in which a separate conductive composition is applied to the paper;

FIGURE 3 shows a paper with a metallic conductive coating applied thereto.

In order to prepare electro-sensitive recording paper, the above-prepared paper can be sprayed on one side with a substance which forms a conductive coating such as graphite, carbon, aluminum, or the like; or the emulsion can be applied to a metallic paper such as, an embossed aluminum-backed paper. In response to an electro-stylus, potassium hydroxide is formed causing the indicator to change color. In order that the paper shall be conductive of electricity, some moisture must be present in the paper. The bicarbonates of both sodium and potassium are somewhat hygroscopic; and, provided that the paper is prepared under conditions of controlled humidity of approximately 70% or more relative humidity, sufficient moisture will be retained in the paper to give sufficient conductivity. For special applications it is, of course, possible to add hygroscopic chemicals as required.

In practicing the instant invention, many combinations of indicators and reactive substances may be used. The indicator can be any compound or element capable of a substantially instantaneous color change due to a pH change, valence change, oxidation or reduction in response to a condition or product produced by the action of the stylus on the secondary or reactive substance.

Many such materials which change color are known to those skilled in the art. However, the preferred indicators are those in which the color change is instantaneous from pale or colorless to black or a deep, vivid color and which do not subsequently fade under the conditions of use. Compounds known as indicators which change color over various pH ranges or when oxidized or reduced can be used with an appropriate secondary compound. Combinations of two indicators may also be employed as the primary material. For example, the indicators methyl orange and indigo carmine could be combined in a ratio 1:2.5.

Although there will generally be a chemical reaction between the indicator and the product obtained by the action of the stylus on the secondary compound, this is not a necessity. The color of an oxidation-reduction indicator for example, depends upon the oxidation potential and anything that produces an appropriate potential will result in the color change.

The secondary compound or combination of two compounds employed in practicing the instant invention must, under the localized action of the stylus, yield a substance or produce a condition which will cause the indicator to change color. For example, if the color of the indicator depends upon pH, as is the case with phenolphthalein, thymol blue, thymolphthalein and the like, a salt such as potassium bicarbonate or sodium bicarbonate can be used as the secondary compound. In response to a heated or electrified stylus these salts yield potassium hydroxide and sodium hydroxide respectively, which cause a color change of the indicator. Phenolphthalein is the preferred indicator for practicing the invention.

In the preferred practice of the invention, paper is sensitized by applying to it an emulsion containing phenolphthalein and potassium bicarbonate. Although it is preferable to apply both the indicator and the reactive substance as an emulsion in a single application, this does not preclude the separate application of the indicator and the reactive substance, either in solution, suspension, or in a dry state. It is also possible to embody one of the compounds in the paper during manufacture. The compounds may be applied to the paper by spraying, dipping, printing, or dry under pressure. Any suitable vehicle for carrying the phenolphthalein and the potassium bicarbonate can be used to prepare the emulsion. In a typical specific example, an emulsion is prepared by mixing 375 cc. water, 1 gram self-emulsifying propylene glycol stearate, 2 grams glyceryl monostearate, and 25 grams potassium bicarbonate at 95° C. Ten grams silica gel and 8 grams phenolphthalein are added to the aqueous mixture. The resulting mixture can be emulsified either by ball-milling for about eight hours or by blending in a high speed blender.

Those skilled in the art can prepare emulsions of the sensitizing chemicals using many other combinations of compounds such as size, gelatin, and a host of glycol compounds; and the invention is not limited to any particular emulsifying agents or vehicle.

In order to make the paper more attractive, small quantities of compounds, such as methylene blue, can also be used in the formula. This gives a blue tinge to the paper and masks pinkness causing the marking to appear blacker.

In order to obtain a nicer looking paper surface and to fix the emulsion more firmly, silicones such as Dow-Corning Syl-off 22 or 23 with their respective catalysts can if desired be used as part of the emulsion or can be sprayed on the paper after application of the emulsion. Alternately, a light spray of clear cellulose lacquer or the like can be applied to the paper.

The amount of indicator and secondary reactive compound applied to the paper will vary depending upon the indicator and may generally cover a range. The concentration of a particular indicator necessary to obtain a color change for example in the presence of potassium hydroxide is known in the art or can easily be determined by experiment, even by one not skilled in the art.

Any conventional type paper or sheet material which is porous so that it can be impregnated with the primary and secondary compounds can be used in practicing the invention. The paper is preferably white or a slightly off-white color, and if desired, may be lined horizontally and vertically at intervals.

The recording paper, prepared as described above and which is sensitive to a heat stylus becomes electrosensitive when a substance such a graphite, a metal or the like which forms a conductive coating is sprayed or deposited on the back of the paper. For example, the heat-sensitive paper is sprayed on one side with a suspension of colloidal graphite in alcohol, preferably containing a small amount of commercial shellac solution. After drying, this coating is sprayed with a light coat of a varnish, such as an acrylic resin varnish, shellac, cellulose, or the like. The function of this varnish coating is merely to fix the graphite and prevent it from coming off when the paper is handled. Alternately, commercial metal-backed paper, such as an embossed aluminum backed paper can be treated with the sensitizing chemicals.

The instant heat-sensitive papers have many substantial advantages as compared with conventional recording papers. The instant papers are much cheaper to manufacture than the coated types of paper, such as the blushed coated papers. My paper is relatively impervious to mechanical marking or scratching, and fingers will not mark the paper. This makes my paper especially suitable for electrocardiography, because it is not easily marred when handled in the hospital, laboratory, or sickroom environment.

The instant heat-sensitive papers can be recorded on both sides when relatively heavy paper is treated by the instant process. Alternately, transparent paper can be treated in accordance with my invention so that conventional ozalid copies can be taken of the recording. This cannot be done with the conventional coated papers unless an expensive medium such as mylar is used.

The electro-sensitive papers prepared by the instant invention also have substantial advantages. They are comparatively economical to manufacture, and will operate with either heat-sensitive or electro-sensitive recorders so that the two kinds of paper need not be stocked. In addition, they can be used with very low voltages, which is an important consideration when transistors are being used. The instant paper can be manufactured without any metal or carbon on the side which contacts the stylus, thereby eliminating build-up of metallic oxide or carbon on the stylus. The instant papers can be used with conventional recording devices.

In order to more fully illustrate details in the practice of the instant invention, the following specific examples are given; however, the invention is not limited thereto.

*Example 1*

Twenty-five grams of potassium bicarbonate were dissolved in 100 ml. of distilled water. This solution was then heated to approximately 95° C., and 0.5 gram of sodium alginate was thoroughly dissolved in the solution. Two grams of propylene glycol stearate were then thoroughly stirred into the solution until dispersed throughout the liquid.

After cooling, 3 grams of finely ground phenolphthalein were added to the solution, and the resulting mixture was ground in a ball mill for approximately six hours. This resulted in an emulsion which can be applied to paper by any convenient means, such as printing, spraying or dipping.

The sodium alginate and the propylene glycol stearate merely act as dispersants for the sensitizing chemicals, and many other compounds can also be used for this purpose.

*Example 2*

The procedure described in Example 1 was followed except that sodium bicarbonate was used instead of potassium bicarbonate. The resulting paper had a lower sensitivity than that described in Example 1.

*Example 3*

The emulsion prepared as described in Example 1 was sprayed on one side of a piece of plain paper. The other side of the paper was sprayed with a suspension of colloidal graphite in ethyl alcohol to which had been added 30 drops of commercial shellac solution per 10 cc. of alcohol mixture. After drying, this coating was then sprayed with a thin coating of acrylic resin varnish and dried. The resulting electro-sensitive paper recorded satisfactorily at voltages as low as 70 volts.

*Example 4*

The paper was prepared as described in Example 3 except that the colloidal graphite was replaced by very finely divided silver powder and the acrylic spray omitted. The resulting paper marked satisfactorily at voltages as low as 20 volts.

*Example 5*

The emulsion prepared as described in Example 1 was applied to the paper side of a piece of commercial aluminum-backed embossed paper. Such paper is customarily employed for the wrapping of certain cigarettes and other products. The resulting paper was both heat and electrosensitive and marked satisfactorily at voltages of from 50 to 70 volts.

*Example 6*

Fifty cubic centimeters turpentine, 50 cc. of a solution prepared by combining 75 grams potassium bicarbonate and 300 cc. water, 1 gram acacia gum, 4 grams phenolphthalein, 0.5 gram d-sorbitol, and 10 drops mineral oil were emulsified by ball-milling for about eight hours. This emulsion can be used for preparing both heat-sensitive and electrosensitive recording papers.

*Example 7*

One gram Aldo 25 (trade name for propylene glycol stearate, self-emulsifying), 2 grams Aldo 33 (glyceryl monostearate, neutral grade), 25 grams potassium bicarbonate, and 375 cc. water were mixed at 95° C. and then mixed with ten grams silica gel and 8 grams phenolphthalein. The resulting mixture was emulsified by blending in a high speed blender. This formula can be used for preparing heat sensitive or electrosensitive papers.

Example 8

Two hundred cubic centimeters of V4 (V4 is a suspension of 2 grams Aldo 25 and 4 grams Aldo 33, defined above, in 300 cc. of water, which has been mixed at 95° C. and emulsified) is mixed with 50 grams potassium bicarbonate, 50 cc. water, 6 grams phenolphthalein, and 4 grams of calcium carbonate. The resulting mixture was emulsified. This formula has been particularly successful in making high sensitivity electrosensitive paper.

Having thus fully described and illustrated the instant invention, what is desired protected by Letters Patent is:

1. A heat-sensitive recording paper comprising a substantially dry paper sheet, and a heat-sensitive composition intimately and substantially uniformly dispersed through said sheet,
  said heat-sensitive composition comprising:
  an alkali metal acid carbonate responsive to heat applied to the surface of said sheet to release carbon dioxide and to form an alkali metal hydroxide in said sheet,
  a pH indicator type dye responsive to the presence of alkali to undergo a marked visible color change, and
  moisture in a small amount but in an amount sufficient to provide a solvent phase for said alkali metal hydroxide and said dye to facilitate reaction therebetween;
  whereby application of a heated stylus to selectable surface areas of said sheet will produce visible marks on said sheet in said selectable surface areas thereof.

2. A heat-sensitive recording paper comprising a substantially dry paper sheet, and a heat-sensitive composition intimately and substantially uniformly dispersed through said sheet,
  said heat-sensitive composition comprising:
  an alkali metal acid carbonate responsive to heat applied to the surface of said sheet to release carbon dioxide and to form an alkali metal hydroxide in said sheet,
  a pH indicator type dye responsive to the presence of alkali to undergo a marked visible color change, and
  a hygroscopic chemical in an amount effective to retain sufficient water in said sheet to render said sheet conductive in the presence of said alkali metal acid carbonate dispersed therethrough;
  whereby application of a heated stylus to selectable surface areas of said sheet will produce visible marks on said sheet in said selectable surface areas thereof.

3. An electrosensitive and heat-sensitive recording paper comprising a substantially dry impregnated and coated paper sheet,
  an electrosensitive and heat-sensitive composition intimately and substantially uniformly dispersed throughout said sheet,
  said composition comprising:
  an alkali metal acid carbonate responsive to heat applied to the surface of said sheet to release carbon dioxide and to form an alkali metal hydroxide in said sheet,
  a pH indicator type dye responsive to the presence of alkali to undergo a marked visible color change,
  moisture in a small amount but in an amount sufficient to provide a solvent phase for said alkali metal hydroxide and said dye to facilitate reaction therebetween;
  and an electro-conductive backing layer coating one surface of said sheet,
  said electro-conductive backing layer comprising a conductive backing material selected from the group consisting of carbon and metals, said conductive backing material being bonded to said surface of said paper sheet;
  whereby contact of a heated stylus and contact of an electrical stylus with said sheet at selectable areas of the other surface of said sheet are each effective to initiate a chemical reaction between said alkali metal hydroxide and said dye to produce visible marks on said sheet in said selectable areas of said last mentioned surface of said sheet.

4. An electrosensitive and heat-sensitive recording paper comprising a substantially dry impregnated and coated paper sheet,
  an electrosensitive and heat-sensitive composition intimately and substantially uniformly dispersed throughout said sheet,
  said composition comprising:
  an alkali metal acid carbonate responsive to heat applied to the surface of said sheet to release carbon dioxide and to form an alkali metal hydroxide in said sheet,
  a pH indicator type dye responsive to the presence of alkali to undergo a marked visible color change,
  moisture in a small amount but in an amount sufficient to provide a solvent phase for said alkali metal hydroxide and said dye to facilitate reaction therebetween;
  and an electro-conductive backing layer coating one surface of said sheet,
  whereby contact of a heated stylus and contact of an electrical stylus with said sheet at selectable areas of the other surface of said sheet are each effective to initiate a chemical reaction between said alkali metal hydroxide and said dye to produce visible marks on said sheet in said selectable areas of said last mentioned surface of said sheet.

5. The recording paper of claim 4 wherein said electro-conductive backing layer is finely divided graphite.

6. The recording paper of claim 4 wherein said electro-conductive backing layer is an aluminum coating.

7. The recording paper of claim 4 wherein said electro-conductive backing layer is a film of silver.

8. The heat-sensitive recording paper of claim 1 wherein said alkali metal acid carbonate is potassium acid carbonate and wherein said dye is phenolphthalein.

9. The method of preparing a heat-sensitive and electro-conductive recording sheet, which method comprises:
  (A) dissolving 25 parts by weight of potassium bicarbonate in about 100 parts by weight of distilled water to produce a solution, heating said solution to approximately 95° C., dissolving 0.5 gram of sodium alginate in said heated solution, dispersing 2 parts by weight of propylene glycol stearate throughout said heated solution, and cooling said solution;
  (B) distributing about 3 parts by weight of finely ground phenolphthalein in the solution of A, grinding the resulting mixture of phenolphthalein and A in a ball mill to produce a fine emulsion;
  (C) impregnating a paper web with said emulsion, and drying the impregnated web to equilibrium conditions defined by an ambient atmosphere of at least about 70% relative humidity.

10. The method of claim 9 and comprising the further steps of
  preparing a suspension of colloidal graphite in ethyl alcohol, dissolving about 10 to about 20 parts by weight of commercial shellac solution in said alcohol suspension, and
  spraying the alcohol-graphite-shellac suspension on one side of said paper web to produce a graphite coating thereon, and drying the graphite-coated web.

11. The method of claim 10 and comprising the further step of applying a resin to said graphite-coated web to fix and to bond the graphite to said web.

12. The method of claim 11 and comprising the further steps of
  preparing a suspension of finely divided metallic powder in a solvent system containing about 10 to about 20 parts by weight of a bonding agent, and coating said web with said suspension on one side thereof, and drying said metal-coated web.

13. A recording paper comprising, in combination, a paper sheet and a sheet impregnating composition distributed substantially uniformly throughout said sheet to provide a chemically impregnated sheet having utility as both an electro-sensitive and a heat-sensitive recording paper, said impregnating composition comprising an emulsion of
   (a) about 50 parts by weight of turpentine with
   (b) about 50 parts by weight of a solution consisting essentially of about 75 parts by weight of potassium bicarbonate, about 300 parts by weight of water, about one part by weight of acacia gum, about 0.5 part by weight of d-sorbitol, and about 0.5 part by weight of mineral oil.

14. A recording paper comprising, in combination, a paper sheet and a sheet impregnating composition distributed substantially uniformly throughout said sheet to provide a chemically treated sheet having utility as an electro-sensitive recording paper, said impregnating composition comprising an emulsion of
   (a) about 200 parts by weight of a suspension of 2 parts by weight of propylene glycol stearate and 4 parts by weight of glycerol monostearate in 300 parts by weight of water, with
   (b) about 50 parts by weight of potassium bicarbonate, 50 parts by weight of water, 6 parts by weight of phenolphthalein, and 4 parts by weight of calcium carbonate.

15. A recording paper comprising, in combination, a paper sheet and a sheet impregnating composition distributed substantially uniformly throughout said sheet to provide a chemically impregnated sheet having utility as both an electro-sensitive and a heat-sensitive recording paper, said impregnating composition comprising an emulsion of
   (a) about 1 part by weight of propylene glycol stearate, 2 parts by weight of glycerol monostearate, 25 parts by weight of potassium bicarbonate, and 375 parts by weight of water, with
   (b) about 10 parts by weight of silica gel and 8 parts by weight of phenolphthalein.

16. The method of preparing a heat-sensitive and an electro-sensitive recording sheet, which method comprises:
   (A) preparing an emulsion of about 50 parts by weight of turpentine with about 50 parts by weight of a solution consisting essentially of about 75 parts by weight of potassium bicarbonate, about 300 parts by weight of water, about 1 part by weight of acacia gum, about 0.5 part by weight of d-sorbitol, and about 0.5 part by weight of mineral oil;
   (B) impregnating a paper web with said emulsion, and drying the impregnated web to equilibrium conditions defined by an ambient atmosphere of at least about 70% relative humidity.

17. The method of preparing an electro-sensitive recording sheet, which method comprises:
   (A) preparing an emulsion of about 200 parts by weight of a suspension of 2 parts by weight of propylene glycol stearate and 4 parts by weight of glycerol monostearate in 300 parts by weight of water, with about 50 parts by weight of potassium bicarbonate, 50 parts by weight of water, 6 parts by weight of phenolphthalein and 4 parts by weight of calcium carbonate;
   (B) impregnating a paper web with said emulsion, and drying the impregnated web to equilibrium conditions defined by an ambient atmosphere of at least 70% relative humidity.

18. The method of preparing a heat-sensitive and an electro-sensitive recording paper, which method comprises:
   (A) preparing an emulsion of about 1 part by weight of propylene glycol stearate, 2 parts by weight of glycerol monostearate, 25 parts by weight of potassium bicarbonate, and 375 parts by weight of water, with about 10 parts by weight of silica gel and 8 parts by weight of phenolphthalein;
   (B) impregnating a paper web with said emulsion, and drying the impregnated web to equilibrium condition defined by an ambient atmosphere of at least about 70% relative humidity.

References Cited in the file of this patent

UNITED STATES PATENTS

| | | |
|---|---|---|
| 483,447 | Higgins | Sept. 27, 1892 |
| 590,139 | Dunlap | Sept. 14, 1897 |
| 1,844,199 | Bicknell et al. | Feb. 9, 1932 |
| 1,897,843 | Hickman et al. | Feb. 14, 1933 |
| 2,400,544 | Kline et al. | May 21, 1946 |
| 2,631,918 | Kozak | Mar. 17, 1953 |
| 2,681,277 | Morrison | June 15, 1954 |
| 2,758,949 | Simon et al. | Aug. 14, 1956 |
| 2,927,834 | Solar | Mar. 8, 1960 |
| 2,940,866 | Sprague | June 14, 1960 |
| 3,017,297 | Newman et al. | Jan. 16, 1962 |

FOREIGN PATENTS

| | | |
|---|---|---|
| 276,020 | Great Britain | Aug. 9, 1928 |